United States Patent [19]
Liddy et al.

[11] Patent Number: 6,006,221
[45] Date of Patent: Dec. 21, 1999

[54] MULTILINGUAL DOCUMENT RETRIEVAL SYSTEM AND METHOD USING SEMANTIC VECTOR MATCHING

[75] Inventors: Elizabeth D. Liddy; Woojin Paik, both of Syracuse; Edmund S. Yu, Dewitt, all of N.Y.; Ming Li, Jersey City, N.J.

[73] Assignee: Syracuse University, Syracuse, N.Y.

[21] Appl. No.: 08/696,701

[22] Filed: Aug. 14, 1996

Related U.S. Application Data
[60] Provisional application No. 60/002,473, Aug. 16, 1995.
[51] Int. Cl.⁶ .................................................. G06F 17/30
[52] U.S. Cl. .......................... 707/5; 704/2; 704/8; 704/9
[58] Field of Search .................................. 707/3, 4, 5, 6; 704/2, 4, 5, 8, 9

[56] References Cited

U.S. PATENT DOCUMENTS

| | | | |
|---|---|---|---|
| 5,148,541 | 9/1992 | Lee et al. ...................................... | 707/2 |
| 5,301,109 | 4/1994 | Landauer et al. ............................ | 704/9 |
| 5,418,951 | 5/1995 | Damashek .................................... | 707/5 |
| 5,794,050 | 8/1998 | Dahlgren et al. ........................ | 395/708 |

OTHER PUBLICATIONS

Croft Bruce et al., "Applications of Multilingual Text Retrieval," *Proceedings of the 29th Annual Hawaii International Conference on System Sciences*, 1996, vol. 5, pp. 98–107.

Liddy, Elizabeth D. et al., "An Overview of DR–LINK and Its Approach to Document Filtering," *Proceedings of the ARPA Workshop on Human Language Technology*, Princeton, NJ. Mar. 21–24, 1993, pp. 358–362.

Liddy, Elizabeth D. et al., "Development, Implementation and Testing of a Discourse Model for Newspaper Texts," *ARPA Workshop on Human Language Technology*, Princeton, NJ, Mar. 21–24, 1993, pp. 1–6.

Liddy, Elizabeth D. et al., "DR–LINK's Linguistic–Conceptual Approach to Document Detection," *Proceedings of First Text Retrieval Conference (TREC–1)*, Published Spring 1993, pp. 1–17.

Liddy, Elizabeth D., "DR–LINK: A System Update for TREC–2," *Proceedings of Second Text Retrieval Conference (TREC–2)*, National Inst. of Standards and Technology, Aug. 31–Sep. 2, 1993, pp. 1–15.

Liddy, Elizabeth D. et al., "DR–LINK System: Phase I Summary," *Proceedings of the TIPSTER Phase I Final Report*, Sep. 19–23, 1993 (Published 1994).

(List continued on next page.)

*Primary Examiner*—Jack M. Choules
*Attorney, Agent, or Firm*—Townsend and Townsend and Crew LLP

[57] ABSTRACT

A document retrieval system where a user can enter a query, including a natural language query, in a desired one of a plurality of supported languages, and retrieve documents from a database that includes documents in at least one other language of the plurality of supported languages. The user need not have any knowledge of the other languages. Each document in the database is subjected to a set of processing steps to generate a language-independent conceptual representation of the subject content of the document. This is normally done before the query is entered. The query is also subjected to a (possibly different) set of processing steps to generate a language-independent conceptual representation of the subject content of the query. The documents and queries can also be subjected to additional analysis to provide additional term-based representations, such as the extraction of information-rich terms and phrases (such as proper nouns). Documents are matched to queries based on the conceptual-level contents of the document and query, and, optionally, on the basis of the term-based representation. The query's representation is then compared to each document's representation to generate a measure of relevance of the document to the query.

35 Claims, 8 Drawing Sheets

OTHER PUBLICATIONS

Liddy, Elizabeth D., "Development and Implementation of a Discourse Model for Newspaper Texts," *Proceedings of the AAAI Symposium on Empirical Methods in Discourse Interpretation and Generation*, Stanford, CA, Dec. 14–17, 1993, pp. 1–6.

Liddy, Elizabeth DuRoss, "An Alternative Representation for Documents and Queries," *Proceedings of the 14th National Online Meeting*, 1993, pp. 279–284.

Liddy, Elizabeth D. et al., "Text Categorization for Multiple Users Based on Semantic Features from a Machine–Readable Dictionary," *ACM Transactions on Information Systems*, vol. 12, No. 3, Jul. 1994, pp. 278–295.

Liddy, Elizabeth D. et al., "Document Retrieval Using Linguistic Knowledge," *Proceedings of the RIAO '94 Conference*, Oct. 11–13, 1994, pp. 106–114.

Liddy, Elizabeth et al., "Detection, Generation, and Expansion of Complex Nominals," *Proceedings of the Workshop on Compound Nouns: Multilingual Aspects of Nominal Composition*, Dec. 2–3, 1994, Geneva, Switzerland, pp. 14–18.

Liddy, Elizabeth D., "Development and Implementation of a Discourse Model for Newspaper Texts," *Proceedings of the ARPA Workshop on Human Language Technology*, Princeton, NJ, Mar. 21–24, 1995, pp. 80–84.

Liddy, Elizabeth et al., "A Natural Language Text Retrieval System With Relevance Feedback," *Proceedings of the 16th National Online Meeting*, May 2–6, 1995, pp. 259–261.

Liddy, Elizabeth D., "The Promise of Natural Language Processing for Competitive Intelligence," *Proceedings of 10th International Conference of the Society of Competitive Intelligence Professionals*, May 4–5, 1995, pp. 328–342.

Paik, Woojin et al., "Interpretation of Proper Nouns for Information Retrieval," *Proceedings of the ARPA Workshop on Human Language Technology*, Princeton, NY, Mar. 21–24, 1993, pp. 1–5.

Paik, Woojin et al., "Categorizing and Standardizing Proper Nouns for Efficient Information Retrieval, " *Corpus Processing for Lexicon Acquisition*, MIT Press, Cambridge, MA, 1995 (Boguraev, B. (ed)) pp. 1–10.

Paik, Woojin, Chronological Information Extraction System (CIES), *Proceedings of the Dagstuhl on Summarizing Text for Intelligent Communication*, Saarbruken, Germany, 1995, pp. 1–5.

Weiner, Michael L. et al., "Intelligent Text Processing, and Intelligence Tradecraft," *The Journal of Association for Global Strategic Intelligence (AGSI)*, Jul. 1995, pp. 1–8.

MULTILINGUAL DOCUMENT RETRIEVAL SYSTEM AND METHOD USING SEMANTIC VECTOR MATCHING

CROSS-REFERENCE TO RELATED APPLICATIONS

This application claims priority from, and is a continuation-in-part of, Provisional U.S. patent application Ser. No. 60/002,473, filed Aug. 16, 1995, of Elizabeth D. Liddy entitled FEASIBILITY STUDY OF A MULTILINGUAL TEXT RETRIEVAL SYSTEM, the disclosure of which is hereby incorporated by reference.

The following provisional applications are also hereby incorporated by reference:

1. No. 60/002,451, of Elizabeth D. Liddy, entitled THE PROMISE OF NATURAL LANGUAGE PROCESSING FOR COMPETITIVE INTELLIGENCE;
2. No. 60,002,452, of Elizabeth D. Liddy and Sung H. Myaeng, entitled DR-LINK SYSTEM: PHASE I SUMMARY;
3. No. 60/002,453, of Elizabeth D. Liddy, Edmund S. Yu, Mary McKenna, and Ming Li, entitled DETECTION, GENERATION AND EXPANSION OF COMPLEX NOMINALS;
4. No. 60/002,470, of Elizabeth D. Liddy, Woojin Paik, and Mary McKenna, entitled DEVELOPMENT OF A DISCOURSE MODEL FOR NEWSPAPERS;
5. No. 60/002,471, of Elizabeth D. Liddy, Woojin Paik, Edmund S. Yu, E. S. and Mary McKenna, entitled DOCUMENT RETRIEVAL USING LINGUISTIC KNOWLEDGE; and
6. No. 60/002,472, of Woojin Paik, Elizabeth D. Liddy, Edmund Yu, and Mary McKenna, entitled CATEGORIZING AND STANDARDIZING PROPER NOUNS FOR EFFICIENT INFORMATION RETRIEVAL.

The following applications, including this one, are being filed concurrently, and the disclosure of each other application is incorporated by reference into this application:

U.S. patent application Ser. No. 08/696,701, entitled "MULTILINGUAL DOCUMENT RETRIEVAL SYSTEM AND METHOD USING SEMANTIC VECTOR MATCHING," to Elizabeth D. Liddy, Woojin Paik, Edmund S. Yu, and Ming Li (Attorney Docket No. 17704-2.00);

U.S. patent application Ser. No. 08/698,472, entitled "NATURAL LANGUAGE INFORMATION RETRIEVAL SYSTEM AND METHOD," to Elizabeth D. Liddy, Woojin Paik, Mary McKenna, and Ming Li (Attorney Docket No. 17704-3.00); and U.S. Pat. application Ser. No. 08/696,702, entitled "USER INTERFACE AND OTHER ENHANCEMENTS FOR NATURAL LANGUAGE INFORMATION RETRIEVAL SYSTEM AND METHOD," to Elizabeth D. Liddy, Woojin Paik, Mary McKenna, Michael Weiner, Edmund S. Yu, Ted Diamond, Bhaskaran Balakrishan, and David Snyder (Attorney Docket No. 17704-4.00).

GOVERNMENT RIGHTS

The U.S. Government has rights in this invention pursuant to Contract No. 94-F159900-000, awarded by the Office of Research and Development, and Contract No. 9331368, awarded by ARPA TRP (U.S. Army Missile Command, Redstone, Ala.).

BACKGROUND OF THE INVENTION

The present invention relates generally to computerized information retrieval, and more specifically to multilingual document retrieval.

A global information economy requires an information utility capable of searching across multiple languages simultaneously and seamlessly. However, when a scientist, patent attorney or patent examiner, student, or any information seeker conducts an electronic search for documents, that search is usually limited to texts in the searcher's native tongue, even though highly relevant information may be freely available in a foreign language. Searching for information across multiple languages invariably proves daunting and expensive, or fruitless and inefficient, and is therefore rarely done.

Patent searching is but one example where limitations of language pose significant obstacles. In prior art terms, all languages are created equal. As a practical matter, a patent examiner in a given country tends to have the most meaningful access to documents in that country's language. Since the most pertinent prior art may be in a different language, patent examiners are often prevented from carrying out an effective examination of patent applications.

The conventional approach to multilingual retrieval is to translate all texts into one common language, then perform monolingual indexing and retrieval. Such systems have several disadvantages. First, the machine translation process, although fully-automated, is often time-consuming and expensive. It is also highly inefficient, since all documents must be translated even though only a small fraction of documents will be relevant to any given query.

Second, the process of translation inevitably introduces errors and ambiguities into the translated document, making subsequent indexing and retrieval troublesome. For example, translation systems perform poorly with specialized discourse (medicine, law, etc.), and are often unable to disambiguate polysemous words (those words with multiple meanings) correctly.

SUMMARY OF THE INVENTION

The present invention provides document retrieval techniques that enable a user to enter a query, including a natural language query, in a desired one of a plurality of supported languages, and retrieve documents from a database that includes documents in at least one other language of the plurality of supported languages. The user need not have any knowledge of the other languages. The present invention thus makes simultaneously searching multiple languages viable and affordable. Even if the documents of interest are all in one language, the invention gives a user whose native language is different the ability to enter queries in the user's native language.

In short, each document in the database is subjected to a set of processing steps to generate a language-independent conceptual representation of the subject content of the document. This is normally done before the query is entered. The query is also subjected to a (possibly different) set of processing steps to generate a language-independent conceptual representation of the subject content of the query. The documents and queries can also be subjected to additional analysis to provide additional term-based representations, such as the extraction of information-rich terms and phrases (such as proper nouns).

Documents are matched to queries based on the conceptual-level contents of the document and query, and, optionally, on the basis of the term-based representation. For example, the matching can be based in part on the co-occurrence of information-rich terms and phrases, or appropriate expansions or synonyms.

The query's representation is then compared to each document's representation to generate a measure of relevance of the document to the query. Results can be browsed using a graphical interface, and individual documents (or document clusters) that seem highly relevant can be used to inform subsequent queries for relevance feedback. The system may also perform a surface-level, gloss transliteration of the foreign text, sufficient enough for a non-fluent reader to gain a basic understanding of the document's contents.

In specific embodiments, the language-independent conceptual representation of the subject content of the document, and that of the query, is a fixed-length vector based on a set of subject content categories and subcategories. A current implementation supports English, French, German, Spanish, Dutch, and Italian. However, the system is modular, and as additional languages are added to the document databases, those languages become searchable.

The invention, by abstracting the documents and queries into language-independent conceptual form, avoids the need for machine translation of the query or the database of documents. Only those documents which appear highly relevant to the searcher need be considered as candidates for translation (human or machine).

A further understanding of the nature and advantages of the present invention may be realized by reference to the remaining portions of the specification and the drawings.

DESCRIPTION OF SPECIFIC EMBODIMENTS 1.0 Introduction

The present invention is embodied in a multilingual document retrieval system, 10, sometimes referred to as CINDOR (Conceptual INterlingua DOcument Retrieval). The CINDOR system is capable of accepting a user's query stated in any one of a plurality of supported languages while seamlessly searching, retrieving and relevance-ranking documents written in any of the supported languages. The system further offers a "gloss" transliteration of target documents, once retrieved, sufficient for a surface understanding of the document's contents.

Unless otherwise stated, the term "document" should be taken to mean text, a unit of which is selected for analysis, and to include an entire document, or any portion thereof, such as a title, an abstract, or one or more clauses, sentences, or paragraphs. A document will typically be a member of a document database, referred to as a corpus, containing a large number of documents. Such a corpus can contain documents in any or all of the plurality of supported languages.

Unless otherwise stated, the term "query" should be taken to mean text that is input for the purpose of selecting a subset of documents from a document database. While most queries entered by a user tend to be short compared to most documents stored in the database, this should not be assumed. The present invention is designed to allow natural language queries.

Unless otherwise stated, the term "word" should be taken to include single words, compound words, phrases, and other multi-word constructs. Furthermore, the terms "word" and "term" are often used interchangeably. Terms and words include, for example, nouns, proper nouns, complex nominals, noun phrases, verbs, adverbs, numeric expressions, and adjectives. This includes stemmed and non-stemmed forms.

The disclosures of all articles and references, including patent documents, mentioned in this application are incorporated herein by reference as if set out in full.

2.0 System Hardware Overview

Figure 1:
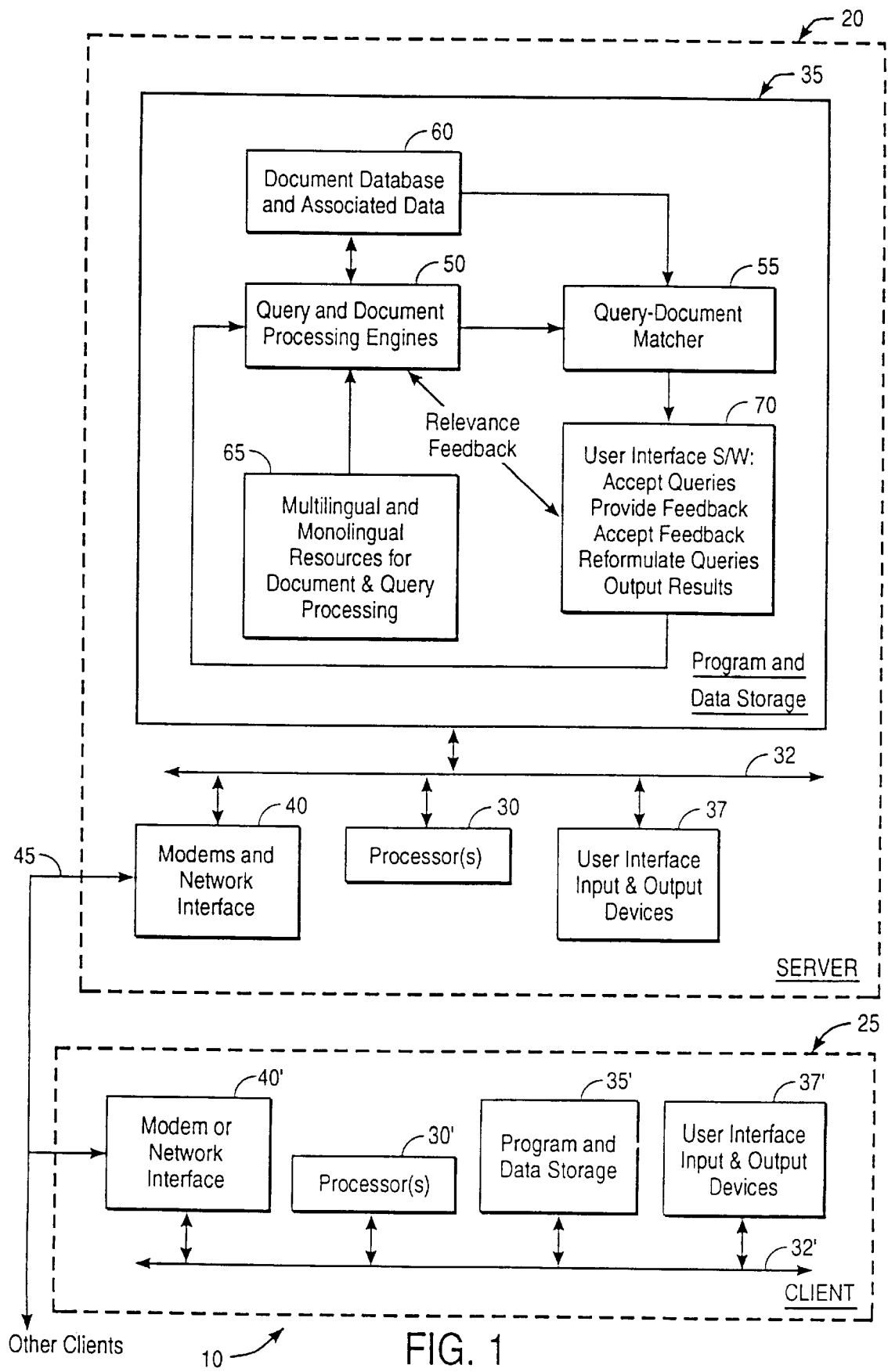
FIG. 1 is a block diagram of a multilingual information retrieval system embodying the present invention.

FIG. 1 is a simplified block diagram of a computer system 10 embodying the multilingual text retrieval system of the present invention. The invention is typically implemented in a client-server configuration including a server 20 and numerous clients, one of which is shown at 25. The use of the term "server" is used in the context of the invention, where the server receives queries from (typically remote) clients, does substantially all the processing necessary to formulate responses to the queries, and provides these responses to the clients. However, server 20 may itself act in the capacity of a client when it accesses remote databases located on a database server. Furthermore, while a client-server configuration is shown, the invention may be implemented as a standalone facility, in which case client 25 would be absent from the figure.

The hardware configurations are in general standard, and will be described only briefly. In accordance with known practice, server 20 includes one or more processors 30 that communicate with a number of peripheral devices via a bus subsystem 32. These peripheral devices typically include a storage subsystem 35 (memory subsystem and file storage subsystem), a set of user interface input and output devices 37, and an interface to outside networks, including the public switched telephone network. This interface is shown schematically as a "Modems and Network Interface" block 40, and is coupled to corresponding interface devices in client computers via a network connection 45.

Client 25 has the same general configuration, although typically with less storage and processing capability. Thus, while the client computer could be a terminal or a low-end personal computer, the server computer would generally need to be a high-end workstation or mainframe. Corresponding elements and subsystems in the client computer are shown with corresponding, but primed, reference numerals.

The user interface input devices typically includes a keyboard and may further include a pointing device and a scanner. The pointing device may be an indirect pointing device such as a mouse, trackball, touchpad, or graphics tablet, or a direct pointing device such as a touchscreen incorporated into the display. Other types of user interface input devices, such as voice recognition systems, are also possible.

The user interface output devices typically include a printer and a display subsystem, which includes a display controller and a display device coupled to the controller. The display device may be a cathode ray tube (CRT), a flat-panel device such as a liquid crystal display (LCD), or a projection device. Display controller provides control signals to the display device and normally includes a display memory for storing the pixels that appear on the display device. The display subsystem may also provide non-visual display such as audio output.

The memory subsystem typically includes a number of memories including a main random access memory (RAM) for storage of instructions and data during program execution and a read only memory (ROM) in which fixed instructions are stored. In the case of Macintosh-compatible personal computers the ROM would include portions of the operating system; in the case of IBM-compatible personal computers, this would include the BIOS (basic input/output system).

The file storage subsystem provides persistent (non-volatile) storage for program and data files, and typically includes at least one hard disk drive and at least one floppy disk drive (with associated removable media). There may also be other devices such as a CD-ROM drive and optical drives (all with their associate removable media). Additionally, the system may include drives of the type with removable media cartridges. The removable media cartridges may, for example be hard disk cartridges, such as those marketed by Syquest and others, and flexible disk cartridges, such as those marketed by Iomega. As noted above, one or more of the drives may be located at a remote location, such as in a server on a local area network or at a site on the Internet's World Wide Web.

In this context, the term "bus subsystem" is used generically so as to include any mechanism for letting the various components and subsystems communicate with each other as intended. With the exception of the input devices and the display, the other components need not be at the same physical location. Thus, for example, portions of the file storage system could be connected via various local-area or wide-area network media, including telephone lines. Similarly, the input devices and display need not be at the same location as the processor, although it is anticipated that the present invention will most often be implemented in the context of PCs and workstations.

Bus subsystem 32 is shown schematically as a single bus, but a typical system has a number of buses such as a local bus and one or more expansion buses (e.g., ADB, SCSI, ISA, EISA, MCA, NuBus, or PCI), as well as serial and parallel ports. Network connections are usually established through a device such as a network adapter on one of these expansion buses or a modem on a serial port. The client computer may be a desktop system or a portable system.

The user interacts with the system using user interface devices 37' (or devices 37 in a standalone system). For example, client queries are typically entered via a keyboard, communicated to client processor 30', and thence to modem or network interface 40' over bus subsystem 32'. The query is then communicated to server 20 via network connection 45. Similarly, results of the query are communicated from the server to the client via network connection 45 for output on one of devices 37' (say a display or a printer), or may be stored on storage subsystem 35'.

3.0 Text Processing (Software) Overview 3.1 Basic Functionality

The server's storage subsystem 35 shows the basic programming and data constructs that provide the functionality of the CINDOR system. The CINDOR software is designed to (1) process text stored in digital form or entered in digital form on a computer terminal to create a database file recording the manifold contents of the text, and (2) match discrete texts (documents) to the requirements of a user's query text. CINDOR provides rich, deep processing of text by representing and matching documents and queries at the lexical, syntactic, semantic and discourse levels, not simply by detecting the co-occurrence of words or phrases. A user of the system is able to enter queries, in the user's own language, as fully-formed sentences, with no requirement for special coding, annotation or the use of logical operators.

The system is modular and performs staged processing of documents, with each module adding a meaningful annotation to the text. For matching, a query undergoes analogous processing to determine the requirements for document matching. The system generates both conceptual and term-based alternative representations of the documents and queries.

The server's storage subsystem 35, as shown in FIG. 1, contains the basic programming and data constructs that provide the functionality of the CINDOR system. The processing modules include a set of processing engines, shown collectively in a processing engine block 50, and a query-document matcher 55. It should be understood, however, that by the time a user is entering queries into the system, the relevant document databases will have been processed and annotated, and various data files and data constructs will have been established. These are shown schematically as a "Document Database and Associated Data" block 60, referred to collectively below as the document database. An additional set of resources 65, possibly including some derived from the corpus at large, is used by the processing engines in connection with processing the documents and queries. As will be described below, resources 65 include a number of multilingual resources.

User interface software 70 allows the user to interact with the system. The user interface software is responsible for accepting queries, which it provides to processing engines 50. The user interface software also provides feedback to the user regarding the query, and, in specific embodiments accepts responsive feedback from the user in order to reformulate the query. The user interface software also presents the results of the query to the user and reformats the output in response to user input. User interface software 70 is preferably implemented as a graphical user interface (GUI), and will often be referred to as the GUI.

Processing of documents and queries follows a modular progression, with documents being matched to queries based on matching (1) their conceptual-level contents, and (2) various term-based and logic representations such as the frequency/co-occurrence of proper nouns. At the conceptual level of matching, each substantive word in a document or query is assigned a concept category, and these category frequencies are summed to produce a vector representation of the whole text. Proper nouns are considered separately and, using a modified, fuzzy Boolean representation, matching occurs based on the frequency and co-occurrence of proper nouns in documents and queries. The principles applied to the proper noun matching are applicable to matching for other terms and parts of speech, such as complex nominals (CNs) and single terms.

While FIG. 1 shows documents and queries being processed, it should be understood that the documents would normally have been processed during an initial phase of setting up the document database and related structures, with relevant information extracted from the documents and indexed as part of the database. Accordingly, in the discussion that follows, when reference is made to documents and queries being processed in a particular way, it is generally to be understood that the processing of documents and queries would be occurring at different times.

3.2 Processing Module Overview

Figure 2:
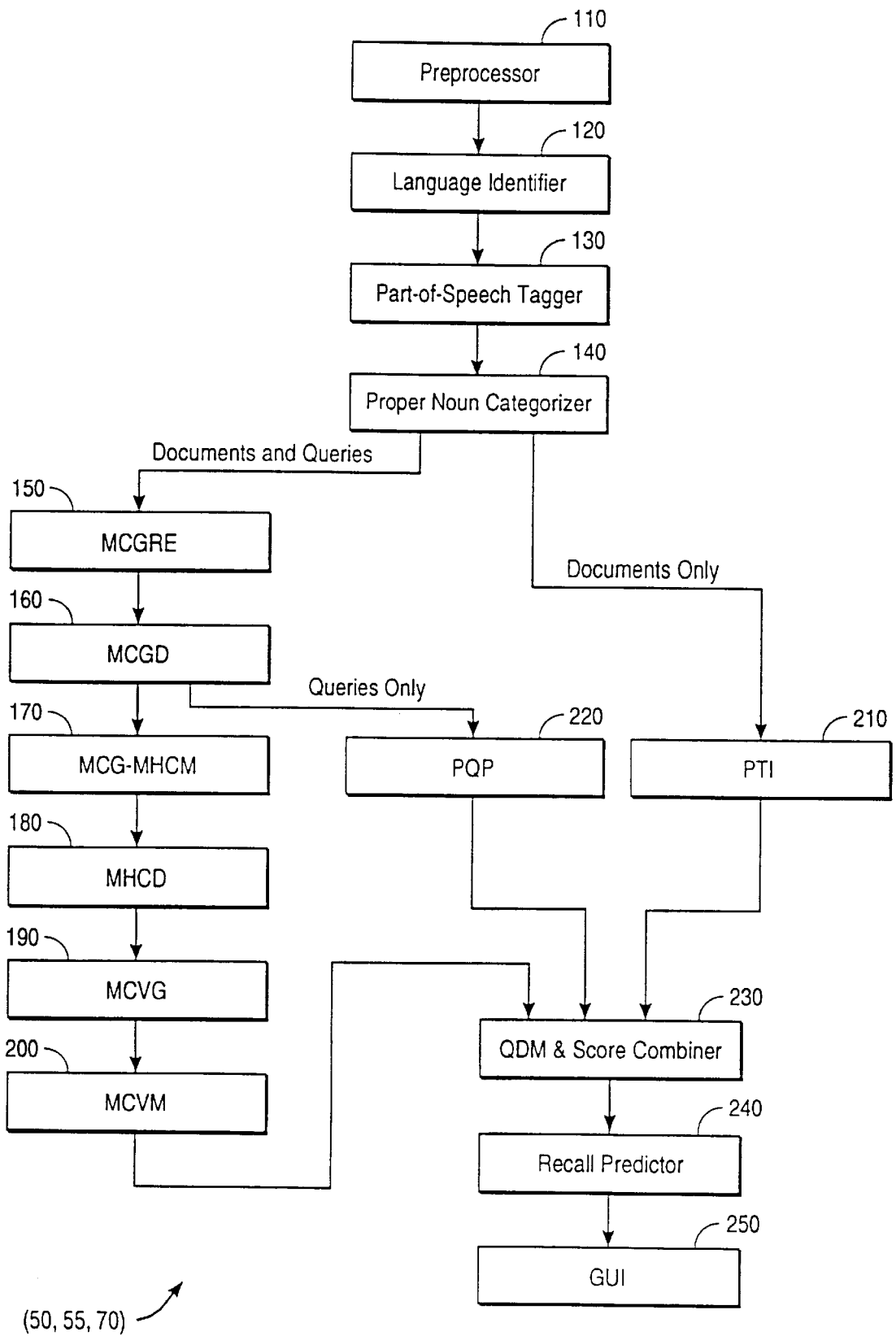
FIG. 2 is a block diagram of the text processing portion of the system.

FIG. 2 is a block diagram showing the set of modules that form processing engines 50, query-document matcher 55, and user interface software 70. Documents and queries are processed by this set of modules that provide a language-independent conceptual representation of each document and query. (As mentioned above, the documents and queries are also subjected to separate processing.) In this context, the modifier "language-independent" means that the documents and queries are all abstracted to a set of categories expressed in a common representation without regard to their original language. This processing is distinct from machine translation, as will be seen below. This does not mean, however, that retrieved documents could not then be translated, by machine or otherwise, if deemed appropriate by the user.

The set of modules that perform the processing to generate the conceptual representation and the term-based representation includes:

- a preprocessor 110,
- a language identifier (LI) 120,
- a part of speech (POS) tagger 130,
- a proper noun categorizer (PNC) 140,
- a multilingual concept group retrieval engine (MCGRE) 150,
- a multilingual concept group disambiguator (MCGD) 160,
- a multilingual concept group to monolingual hierarchical concept mapper (MCG-MHCM) 170,
- a monolingual hierarchical concept category disambiguator (MHCD) 180,
- a monolingual category vector generator (MCVG) 190,
- a monolingual category vector matcher (MCVM) 200,
- a probabilistic term indexer (PTI) 210,
- a probabilistic query processor (PQP) 220,
- a query to document matcher (QDM) and score combiner 230,
- a recall predictor 240, and
- a graphical user interface (GUI) 250.

The output of MCVG 190 is a monolingual category vector (also referred to as the semantic vector, or simply the vector) for each document and query, and represents the documents or query at a language-independent conceptual level. The query's monolingual category vector is matched or compared with monolingual category vectors of the documents by MCVM 200. The output from MCVM 200 provides a measure of relevance (score) for each document with respect to the query.

While this information alone could be used to rank documents, it is preferred to subject the documents and the queries to an additional set of operations to provide additional bases for evaluating relevance. To this end, the document information output from PNC 140 is communicated to PTI 210, while the query information from MCGD 160 is communicated to PQP 220. PTI 210 and PQP 220 provide term-based representations of the documents and query, respectively.

The outputs from MCVM 200, PTI 210, and PQP 220 are evaluated by QDM and score combiner 230, which provides a score for each document. The output scores are processed by recall predictor 240 so as to select a proper set for output. The results are stored, and typically presented to a user for browsing at GUI 250.

The processing modules can be grouped at a higher level. Preprocessor 110, LI 120, POS tagger 130, and PNC 140 perform initial processing for tagging and identification; MCGRE 150, MCGD 160, MCG-MHCM 170, MHCD 180, and MCVG 190 generate conceptual-level representations of the documents and queries; PTI 210 and PQP 220 generate term-based representations of the documents and queries; MCVM 200 and QDM and score combiner 230 correlate the document and query information to provide an evaluation of the documents; and recall predictor 240 and GUI 250 are concerned with presenting the results to the user.

A number of the processing modules mentioned above rely on associated resources, including databases and the like. While these resources will be described in connection with the following detailed descriptions of the modules, they are enumerated here for clarity.

PNC 140:
proper noun knowledge databases (PKND).

MCGRE 150:
multilingual concept database (MCD).

MCGD 160:
multilingual concept group n-gram probability database,
multilingual concept group correlation matrix (MCGCM), and
frequency database.

MCG-MHCM 170:
monolingual hierarchical concept dictionary (MHCD).

MHCD 180:
monolingual category correlation matrix (MCCM).

MCVG 190:
index.

What follows is a module by module description of the system.

4.0 Initial Processing and Tagging 4.1 Preprocessor 110

Preprocessor 110 accepts raw, unformatted text and transfers this to a standard format suitable for further processing by CINDOR. The preprocessor performs document-level processing as follows:

The beginning and end of documents are identified and marked.

Discourse-Level tagging occurs. Various fields and text types are identified and tagged in a document, including "headline," "sub-text headline," "date," and "caption."

All text is annotated with SGML-like tags (standard generalized markup language, set forth as ISO standard 8879).

4.2 Language Identifier (LI) 120

LI 120 determines by means of a combination of n-gram and word frequency analysis the language of the input document. The output of the LI is the document plus its language identification tag.

Two parallel approaches for language identification are employed. The first approach operates by scanning documents for a distribution of language-discriminant, common single words. The occurrence, frequency and distribution of these words in a document is compared against the same distributions gathered from a representative corpus of documents in each of the supported languages. The second approach involves locating common word/character sequences unique to each language. Such sequences may form actual words that often occur, such as conjunctions, or a mix of words, punctuation and character strings. Language identification involves scanning each document until a target character sequence is located.

It should be realized that the LI is not necessary if the documents are already tagged as to their language.

4.3 Part of Speech (POS) Tagger 130

The language dependent, probabilistic, POS tagger 130 determines the appropriate part of speech for each input word in the document and outputs a part of speech tagged document, plus its language identification tag.

POS tagger 130 is used to identify various substantive words such as nouns, verbs, adjectives, proper nouns, and adverbs in each of the supported languages. Various functional words such as conjuncts are tagged as stop-words and are not used for matching purposes. Each language-specific POS tagger is a commercial off-the-shelf (COTS) technology.

4.4 Proper Noun Identifier & Categorizer (PNC) 140

In addition to the parts of speech processing in POS tagger 130, additional processing of proper nouns occurs in a separate processing module, namely PNC 140, which performs the following tasks:

Identifies and tags adjacent proper nouns in a text using the Proper Noun Boundary Identifier (PNBI). The PNBI uses various heuristics developed through multilingual corpus analysis to bracket adjacent proper nouns (e.g., IBM Corporation) and bracket proper nouns with embedded conjunctions and prepositions (e.g., the Bill of Rights). For example, one heuristic takes the form of a database of proper nouns such as University or Mayor that are frequently linked to proximate proper nouns by the preposition "of." In another scheme, specific instantiations of adjacent proper nouns can be stored in a database. Each supported language has an independent array of tools and embedded databases for detecting and tagging adjacent proper nouns.

Normalizes each proper noun to its standard form. For example, "IBM" and the colloquial "Big Blue" are both normalized to the standard form of "International Business Machines, Inc." in the knowledge database.

Expands group proper nouns to their constituent members using the proper noun knowledge databases. For example, the group proper noun "European Community" is expanded to all member countries (Great Britain, France, Germany, etc.). Later matching would consider all expansions on the original proper noun group.

Assigns monolingual concept-level categories from a proper noun hierarchical classification scheme to certain proper nouns or portions of proper nouns. The proper noun classification scheme is based on algorithmic machine-aided corpus analysis in each supported language. In a specific implementation, the classification is hierarchical, consisting of nine branch nodes and thirty terminal nodes. Clearly, this particular hierarchical arrangement of codes is but one of many arrangements that would be suitable. Table 1 shows a representative set of proper noun concept categories and subcategories.

TABLE 1

Proper Noun Categories and Subcategories

| Geographic Entity: | Human: |
|---|---|
| City | Person |
| Port | Title |
| Airport | Document: |

TABLE 1-continued

Proper Noun Categories and Subcategories

| | |
|---|---|
| Island | Document |
| County | Equipment: |
| Province | Software |
| Country | Hardware |
| Continent | Machines |
| Region | Scientific: |
| Water | Disease |
| Geographic Miscellaneous | Drugs |
| Affiliation: | Chemicals |
| Religion | Temporal: |
| Nationality | Date |
| Organization: | Time |
| Company | Miscellaneous: |
| Company Type | Miscellaneous |
| Government | |
| U.S. Government | |
| Organization | |

Classification is accomplished by reference to an array of knowledge bases and context heuristics, which collectively define the proper noun knowledge database (PNKD). The PNKD was built by analyzing a large corpus of texts, and contains the following different types of information which are used to categorize and standardize proper nouns in texts:

(1) lists of common prefixes and suffixes which suggest certain types of proper noun categories;

(2) lists of contextual linguistic clues which suggest certain types of proper noun categories;

(3) lists of commonly used alternative names of the highly frequent proper nouns; and (4) lists of highly common proper nouns and the categories to which the proper nouns belong.

Classification includes (but is not limited to) company name, organization names, geographic entities, government units, government and political officials, patented and trademarked products, and social institutions. Monolingual proper noun concept categories are used to help form the monolingual category vector representation of both the document and query (see later descriptions). As noted above, the documents and queries output from PNC 140 are communicated to MCGRE 150, while in the specific implementation the documents only are communicated to PTI 210.

5.0 Generation of Conceptual Level Representation 5.1 Multilingual Concept Group Retrieval Engine (MCGRE) 150

Modules 150 through 190 (i.e., MCGRE 150, MCGD 160, MCG-MHCM 170, MHCD 180, and MCVG 190) are used to generate monolingual category vector codes of the subject-contents of both documents and queries. This process involves recognizing various information-rich words or parts of speech in a native language text, assigning a single code to these words or phrases that establishes its conceptual-level meaning, then mapping this conceptual-level representation to an English language, hierarchical system of concept codes for vector creation.

The first of these modules, MCGRE 150, accepts the language-identified, part-of-speech tagged, input text and retrieves from the multilingual concept database any and all of the concept groups to which each input word belongs. Polysemous words (those words with multiple meanings)

will have multiple concept group assignments at this stage. The output of the MCGRE 150, when run over a document, will be sentence-delimited strings of words, each word or phrase of which has been tagged with the codes of all the multilingual concept groups to which various senses of the word/phrase belongs.

This process incorporates:
   (a) Deinflection of words (finding their root form);
   (b) Locating clitics (articles or pronouns attached to words or punctuation, as with the French "l'enfant");
   (c) Identifying and splitting compound words (words consisting of two or more linked words); and
   (d) Mapping each word to all possible corresponding concept categories using the multilingual concept database (MCD).

The MCD is a language-independent knowledge database comprising a collection of non-hierarchical concept groups. There are about 10,000 concept groups in a current implementation. Within each concept group is a collection of words or phrases, in multiple languages, that are conceptually synonymous or near-synonymous. Usually all members of a given concept group belong to the same part of speech. It is possible that many words in a given language will occur in a given concept group, or that a given word or phrase will occur in multiple concept groups. The number of concept groups that a given word or phrase occupies is dependent on the degree of polysemy of that word or phrase. For example, a word that has three possible senses may occupy three different concept groups. Each group is considered a language-independent concept. Note that the MCD differs from a thesaurus because the concept groups are not linked by broader or narrower relations. The MCD differs from a dictionary translation because the MCD grouping is by synonymous words, not by translation definition.

5.2 Multilingual Concept Group Disambiguator (MCGD) 160

The input to MCGD 160 is the fully-tagged text stream from MCGRE 150 with polysemous words having multiple concept-category tags. The function of the MCGD is to select the single most appropriate concept group from the multilingual concept database for all those input words for which multiple concept group tags have been retrieved. The output of the MCGD is a fully-tagged text stream with a single multilingual concept group for each word in the input text. The processing performed by this module is similar to that discussed in copending commonly-owned U.S. patent application Ser. No. 08/135,815, filed Oct. 12, 1993, entitled "Natural Language Processing System For Semantic Vector Representation Which Accounts For Lexical Ambiguity," to Elizabeth D. Liddy, Woojin Paik, and Edmund Szu-Li Yu, though modified for a multilingual system. The application mentioned immediately above, hereinafter referred to as "Natural Language Processing," is hereby incorporated by reference for all purposes.

Figure 3A:
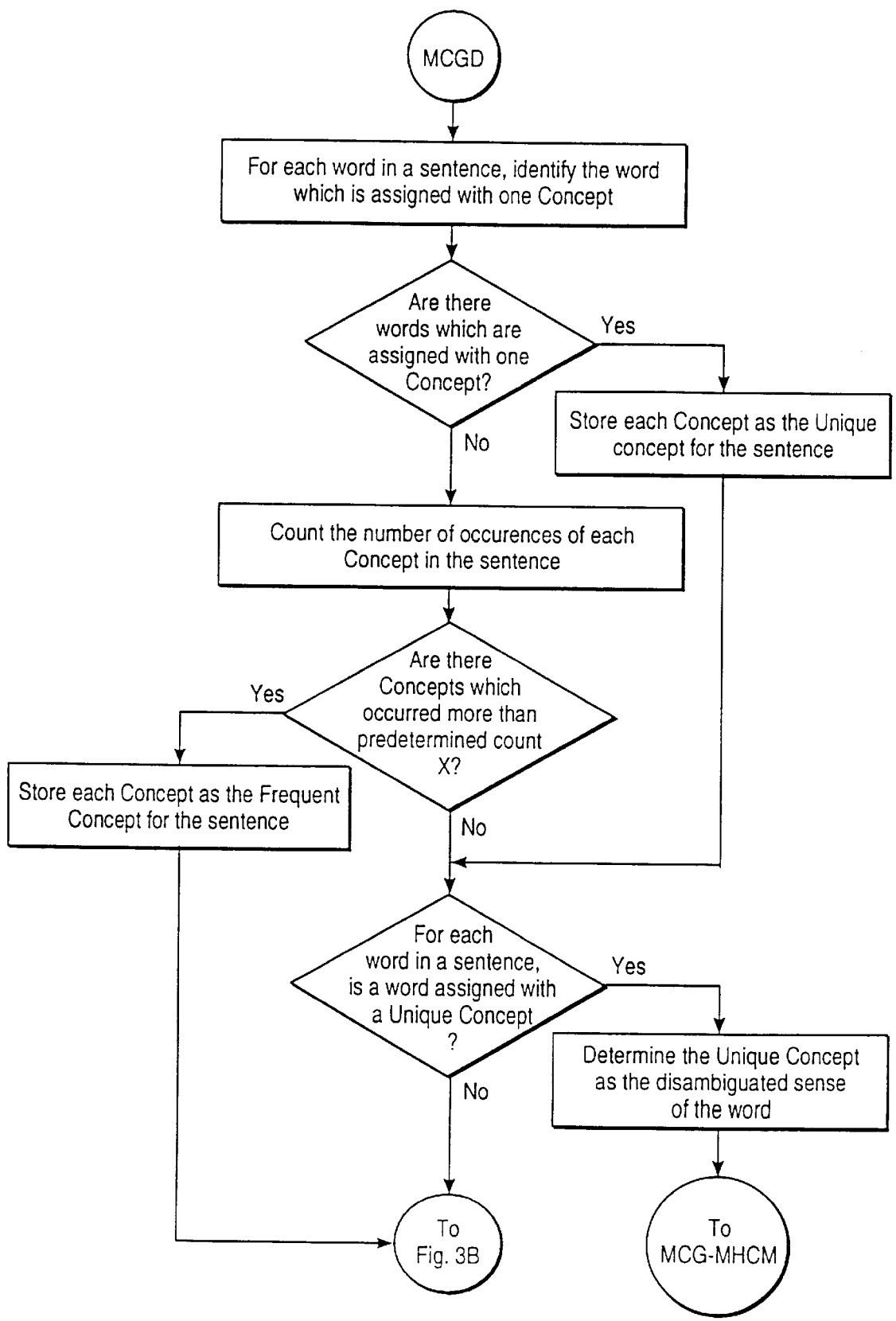
FIGS. 3A and 3B, taken together, provide a flowchart showing the operation of the multilingual concept group disambiguator (MCGD)
Figure 3B:
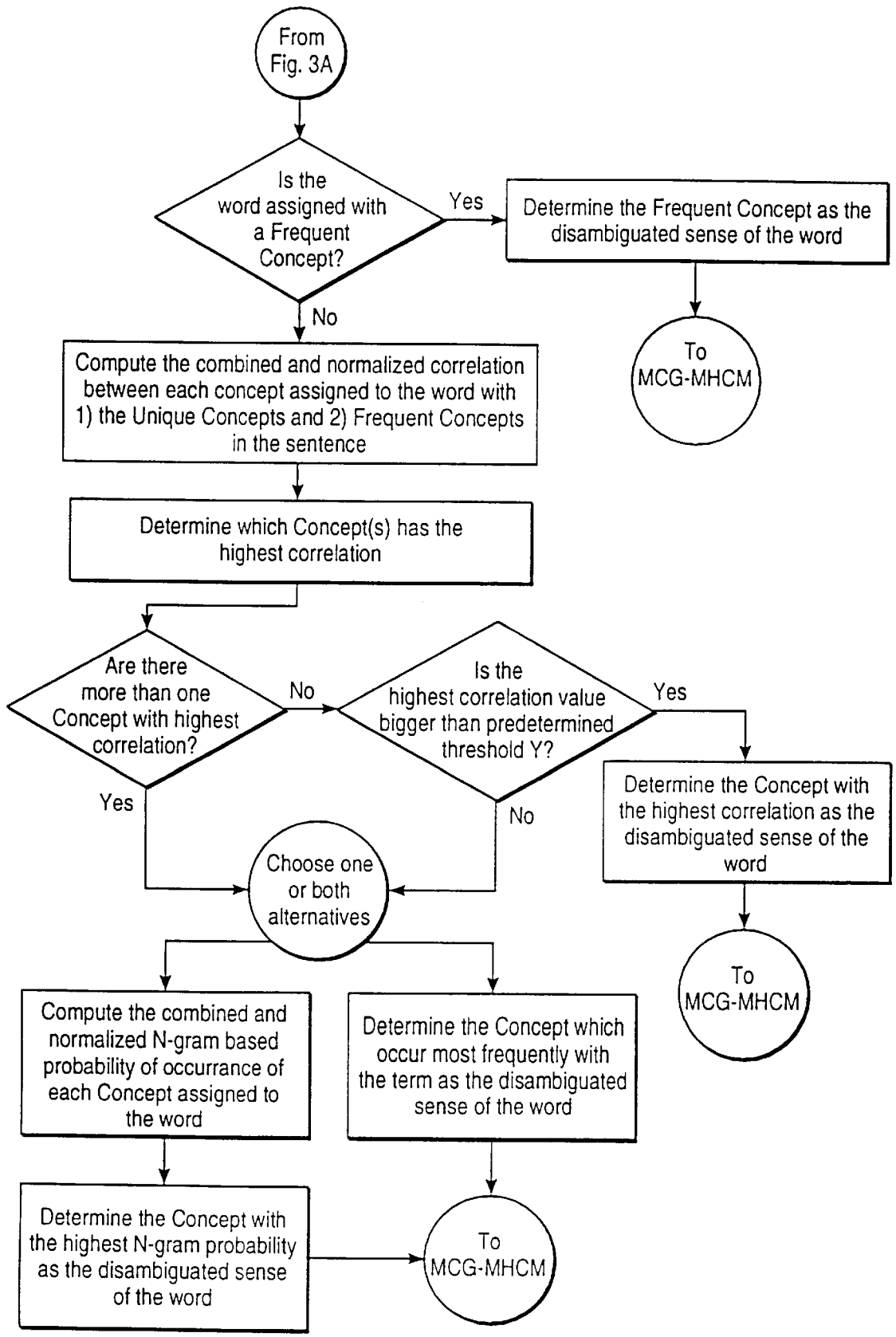

FIGS. 3A and 3B, taken together, provide a flowchart showing the operation of MCGD 160. MCGD 160 processes text a sentence at a time, using the original language of the input text as a useful context for selecting the most appropriate sense of the words in a sentence.

If disambiguation is needed (the input word belongs to more than one concept group), then the MCGD will select the appropriate concept group using three sources of linguistic evidence. These are: (a) Local Context, (b) Domain Knowledge, and (c) Global Information, which are used as follows.

5.2.1 Local Context

If a word in the sentence has been tagged with only one concept group code, this concept group code is considered Unique. Further, if there are any concept group codes which have been assigned to more than a predetermined number of words within the sentence being processed, these concept group codes are considered Frequentcodes. These two types of locally determined concept group codes are used as "anchors" in the sentence for disambiguating the remaining words. If any of the ambiguous (polysemous) words in the sentence have either a Unique or Frequent concept group code amongst their codes, that concept group code is selected and that word is thereby disambiguated.

FIG. 3A shows this process where MCGD 160 determines whether a given multilingual concept group code is Unique or Frequent, and further whether a given ambiguous word has a Unique or Frequent code as one of its assigned codes. To the extent that the word is associated with a Unique or Frequent code, that Unique or Frequent code is used.

However, a word which has no overlap between its concept group codes and the Unique or Frequent concept group codes for that sentence cannot be disambiguated using local context evidence, and must be evaluated by the next source of linguistic evidence, Domain Knowledge.

5.2.2 Domain Knowledge

Domain Knowledge representations reflect the extent to which words of one concept group tend to co-occur with words of the other concept groups (hence the notion of the domain predicting the sense). For each word which has not had one of its multiple concept group codes selected using local information, the system consults the multilingual concept group correlation matrix (MCGCM) to select an appropriate concept group code from the multiple concept group codes attached to the input word.

The MCGCM is an optional knowledge database that reflects observed document level co-occurrence patterns across a large corpus of single language documents. This correlation matrix is built from the training data to be used as an additional knowledge source to disambiguate multiple concept groups which are assigned to the terms in both query and documents. The training data which is used to construct the correlation matrix is either all possible concept groups assigned to each term in the texts, or the partially disambiguated concept groups in the texts. Thus, the construction of the correlation matrix does not require manual intervention.

This correlation matrix is constructed from the correlation information among all concept groups assigned to terms in one document. The collection of the correlation information is summed and normalized to get the stable correlation among all possible concept groups (i.e., each concept group will have a correlation value against all the other possible concept groups.)

The MCGCM consists of unweighted Pearson's product-moment correlation coefficients for all of the multilingual database concept group pairs using within-document occurrences as the unit of analysis. The result will be correlation scores for each concept group pair between −1 and +1. Within a sentence a word with multiple concepts categories is disambiguated to the single concept category that is most highly correlated with the Unique or Frequent concept category. If several Unique or Frequent anchor words exist, the ambiguous word is disambiguated to the correct category of the anchor word with the highest overall correlation coefficient.

The Local and Domain Knowledge evidence sources can select a concept group code for each word in the sentence, if at least a single Unique or Frequent concept group code was selected as an "anchor" code for the sentence. But, for words in those sentences for which an "anchor" was not found, the third evidence source, Global Knowledge, will need to be consulted.

5.2.3 Global Knowledge

Global Knowledge simulates the observation made in human sense disambiguation that more frequently used senses of words are cognitively activated in preference to less frequently used senses of words. Therefore, the words not yet disambiguated by Local Context or Domain Knowledge will now have their multiple concept group codes compared to a Global Knowledge database source, referred to as the frequency database. The database is an external, off-line sense-tagging of parallel corpora with the correct concept group code for each word. The disambiguated parallel corpora will provide frequencies of each word's usage as a particular sense (equatable to concept group) in the sample corpora. The most frequent sense is selected as the concept category.

The frequency database can be constructed in any of the following three ways:

(1) Collect the most frequent sense information from partially or fully sense-disambiguated texts (the training data to collect sense frequency information can be built either manually or automatically). Training data can be built automatically from the output from MCGD module without the frequency database OR the output from automatic sense comparison using multilingual aligned corpus such as "Canadian Hansard."

(2) Have a native language expert select the most common sense of terms.

(3) Use frequency information from a lexicon that provides its senses with frequency information.

The multilingual concept group n-gram probability database is an optional knowledge database that is constructed from a training data set. The database contents are derived from a text corpus analysis of words used in various supported languages in various contexts. The data in the database can be either (1) sense-correct concept groups assigned to each term in the texts, or (2) all possible concept groups assigned to each term in the texts (e.g., if one term belongs to three concept groups, then three concept groups will be assigned to that term).

This knowledge database collects all concept groups which are assigned to N adjacent terms in the texts. The resulting ordered lists are summed and normalized to produce the likelihood probability of the Nth term assigned with certain concept groups which are assigned to the (N–1)th, . . . (N–(N–1))th terms.

FIG. 3B shows this process where MCGD 160 has had to resort to Domain Knowledge (using the MCGCM) and Global Knowledge (using the n-gram probability database) to disambiguate the polysemous words.

The output of MCGD 160 is a single multilingual concept group for each substantive word in the input text. This concept group may comprise either a single word choice or several word choices, depending on the membership of the concept group. Words from all supported languages will be represented.

5.3 Multilingual Concept Group to Monolingual Hierarchical Concept Mapper (MCG-MHCM) 170

MCG-MHCM 170 takes as input the fully-tagged, native language text stream with single multilingual concept categories assigned for each substantive word and maps this flat conceptual representation to an English language hierarchical representation. MCG-MHCM 170 performs the following:

(a) Maps all the native language words in a single concept category to the English word member/s in that category.

(b) Converts the English word members of the selected concept group from the multilingual concept database (MCD) to zero or more categories in the monolingual hierarchical concept dictionary (MHCD). This is a static mapping scheme, whereby all the English word members of a particular concept group are treated as being equally likely instantiations. In this static implementation, all English word members of the selected multilingual concept group are mapped to their respective categories in the MHCD. The frequencies of the concept categories mapped to by the English word members of the selected multilingual concept group of a word are summed and the most frequent category for that word is selected. If there are multiple categories in the MHCD to which the English word members of the multilingual concept group map, then these multiple categories need to be disambiguated in the next component of the system.

(c) Maps the many thousand multilingual concept categories to fewer, higher order monolingual categories.

The MHCD is different from the MCD in that the MHCD consists of terms in one language (in the current system, English terms make-up the database). While the MHCD and MCD both define concepts as a groups of synonyms, the MHCD can be characterized by the hierarchical organization which is imposed on the concepts. The hierarchy can be constructed by relating concepts with relations such as "super/sub type" and "broader/narrower." In the current implementation, the MHCD is a COTS product.

The output of the MCG-MHCM module is a tagged, native language text stream with unique, monolingual (English), hierarchical concept categories assigned to each identified substantive word.

5.4 Monolingual Hierarchical Concept Category Disambiguator (MHCD) 180

MHCD 180 accepts the monolingual categories assigned to substantive words in a text and performs disambiguation similar to that performed by the multilingual concept group disambiguator (MCGD) module. The disambiguation process is similar to the disambiguation performed by the Subject Field Code (SFC) disambiguator covered in "Natural Language Processing."

The MHCD performs the following processing of text using the following evidence sources:

(a) Local Context—The processing here will be nearly identical to the use of local information in MCGD 160 described above. That is, Unique or Frequent categories will be determined for each sentence and then used as "anchors" to select one monolingual category from amongst the multiple monolingual categories to which an ambiguous multilingual concept group has mapped.

(b) Domain Knowledge—The monolingual category correlation matrix (MCCM) is used to indicate the probabilities that the multiple monolingual categories to which a multilingual concept group has been mapped correlate with the Unique or Frequent monolingual category determined by local context. The MCCM is produced from a document corpus, and is similar to the multilingual concept (MCGCM) in terms matrix (MCGCM) in terms of how the two are constructed and their internal structures.

(c) Global Knowledge—If there is no Unique or Frequent monolingual category in an input sentence, then the system has no "anchor" by which to access the Correlation Matrix and must use global knowledge. In this event, the frequency of use of various senses of a word is used as the basis for the global knowledge source.

The output of the MHCD module is a text stream with disambiguated monolingual categories assigned to each substantive word.

5.5 Monolingual Hierarchical Concept Dictionary-Based Vector Generator (MCVG) 190

MCVG 190 accepts a text stream with single monolingual category assigned to each substantive word in a text, and produces a fixed-dimension vector representation of the concept-level contents of the text. The basic processing performed by this module is the same as that performed by the Subject Field Code (SFC) vector generator described in "Natural Language Processing."

The MCVG generates a representation of the meaning (context) of the text of a document/query in the form of monolingual category (subject) codes assigned to information bearing words in the text. The monolingual category vector for all documents and queries has the same number of dimensions; weights or scores are applied to each dimension according to the presence and frequency of text with certain subject-contents.

The MCVG creates a vector code index file for each document to facilitate efficient searching and matching. Typically, the relative importance of the concept in each document and the link between the term and the document in which the term occurred is preserved. The vector code index file for each document is a fixed length file containing scores/weights for each dimension (called a slot) of the vector.

MCVG 190 performs the following staged processing:

(a) The frequencies of the disambiguated monolingual category codes assigned to words in the text are summed and then normalized in order to control for the effect of document length.

(b) The resulting normalized document vectors are fixed-dimension vectors representing the concept-level contents of the processed text (either documents or queries). They are passed to the next module for either document-to-query-vector matching (comparison), or for document-to-document matching (comparison) for clustering of documents.

5.6 Concept Mapper and Disambiguator Operation

Figure 4:
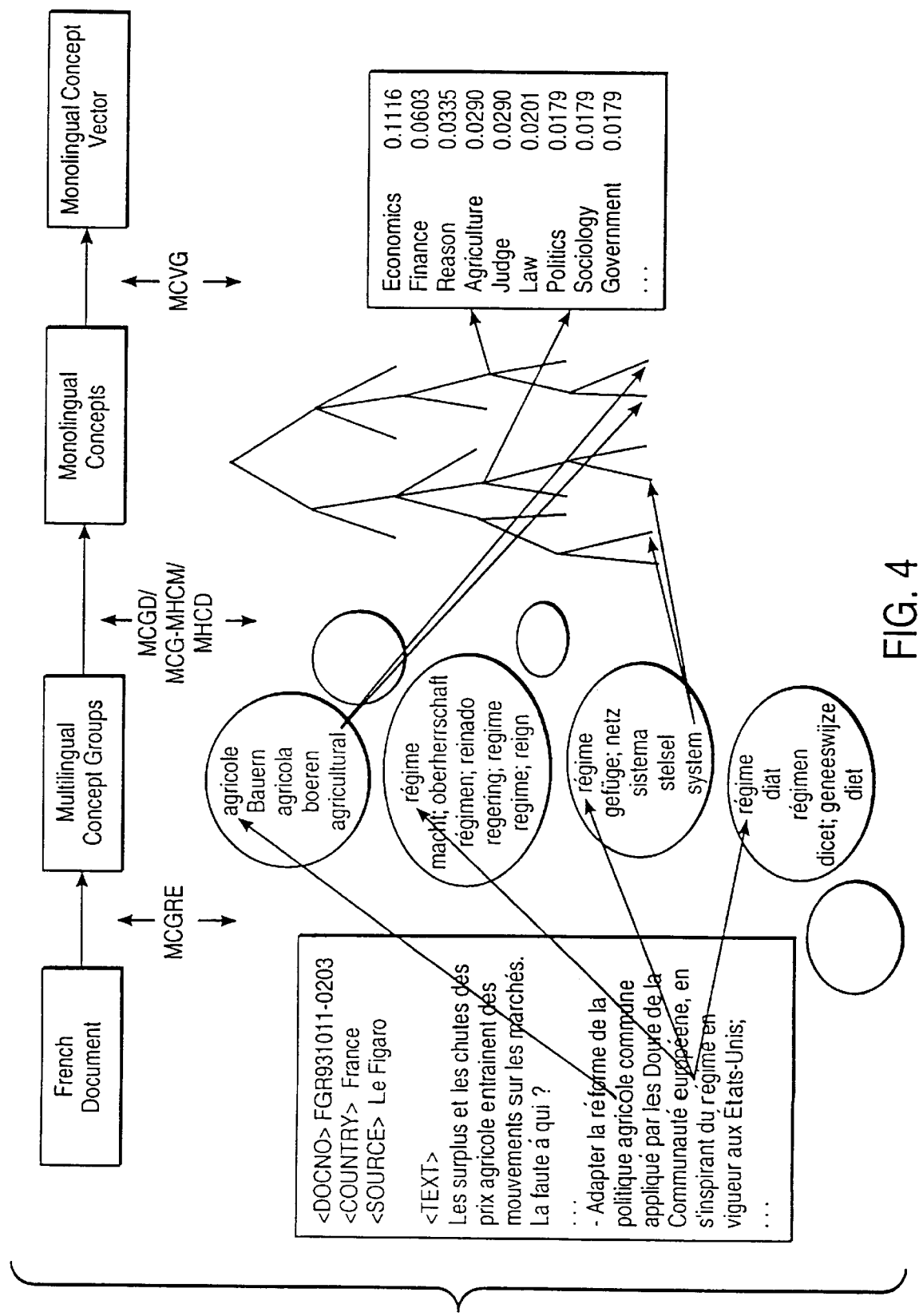
FIG. 4 is a high-level diagram showing the processing of French input text to a monolingual concept vector.
Figure 5:
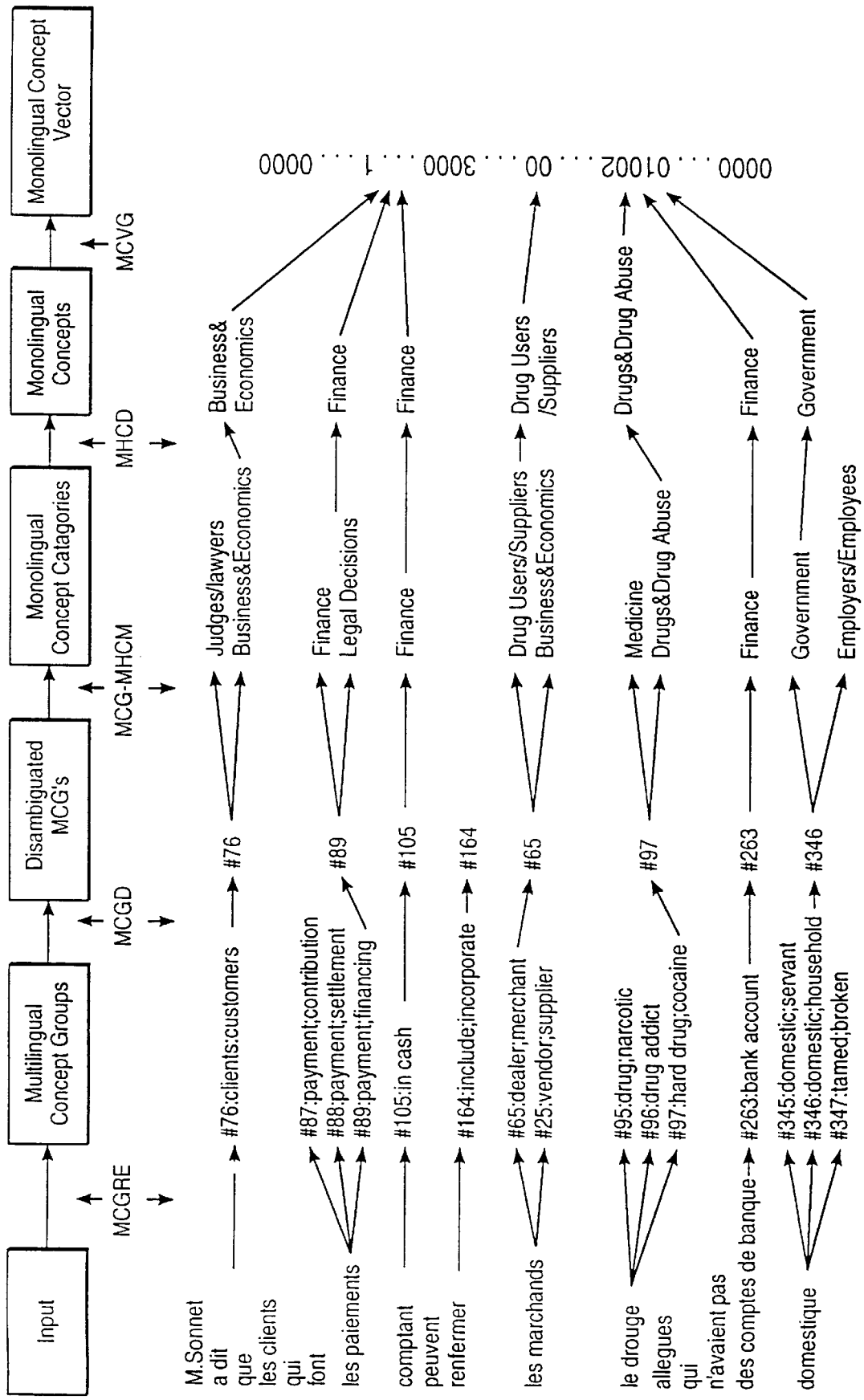
FIG. 5 is a more detailed diagram showing the two stages of disambiguation in the processing of French input text to a monolingual concept vector.

FIGS. 4 and 5 are diagrams showing concrete examples of the processing of French input text to a monolingual concept vector.

FIG. 4 shows the mapping of two substantive French words, "agricole" and "regime." The word "agricole" can be seen to map to a single multilingual concept group with the English language member "agricultural." As can be seen, this multilingual concept group maps to the monolingual category "Agriculture," and contributes to the monolingual category vector, a portion of which is shown schematically at the right side of the figure.

The French word "regime," on the other hand, is polysemous, and maps to three multilingual concept groups (e.g., concept groups with the English language members "reign," "system," and "diet"). The word needs to be disambiguated using the methodology described in the above discussion of MCGD 160, MCG-MHCM 170 and MHCD modules, such that an unambiguous, single concept code is assigned to the word. In this simple example, since no Local Context or Domain Knowledge can be applied to the disambiguation process by the word "agricole," (and, for the purposes of this example, we assume no other words help in this disambiguation process), Global Knowledge will be applied and the most common sense of the word will be invoked ("system").

FIG. 5 shows a complete single French sentence as input, and shows the two-stage disambiguation explicitly. The native language sentence is shown being processed through the multilingual concept group generation process, to a monolingual conceptual representation with disambiguated concept codes. For simplicity, only the English language members of the multilingual concept groups are shown. In this example, the complete sentence has "anchor codes" (e.g., "comptant," which maps to code #105, with the English member "in cash") that can be used to help disambiguate other polysemous words in the sentence using Local or Domain processing. For example, the French "les paiements" maps to three codes, which are disambiguated at the MCGD to a Finance code).

Figure 6:
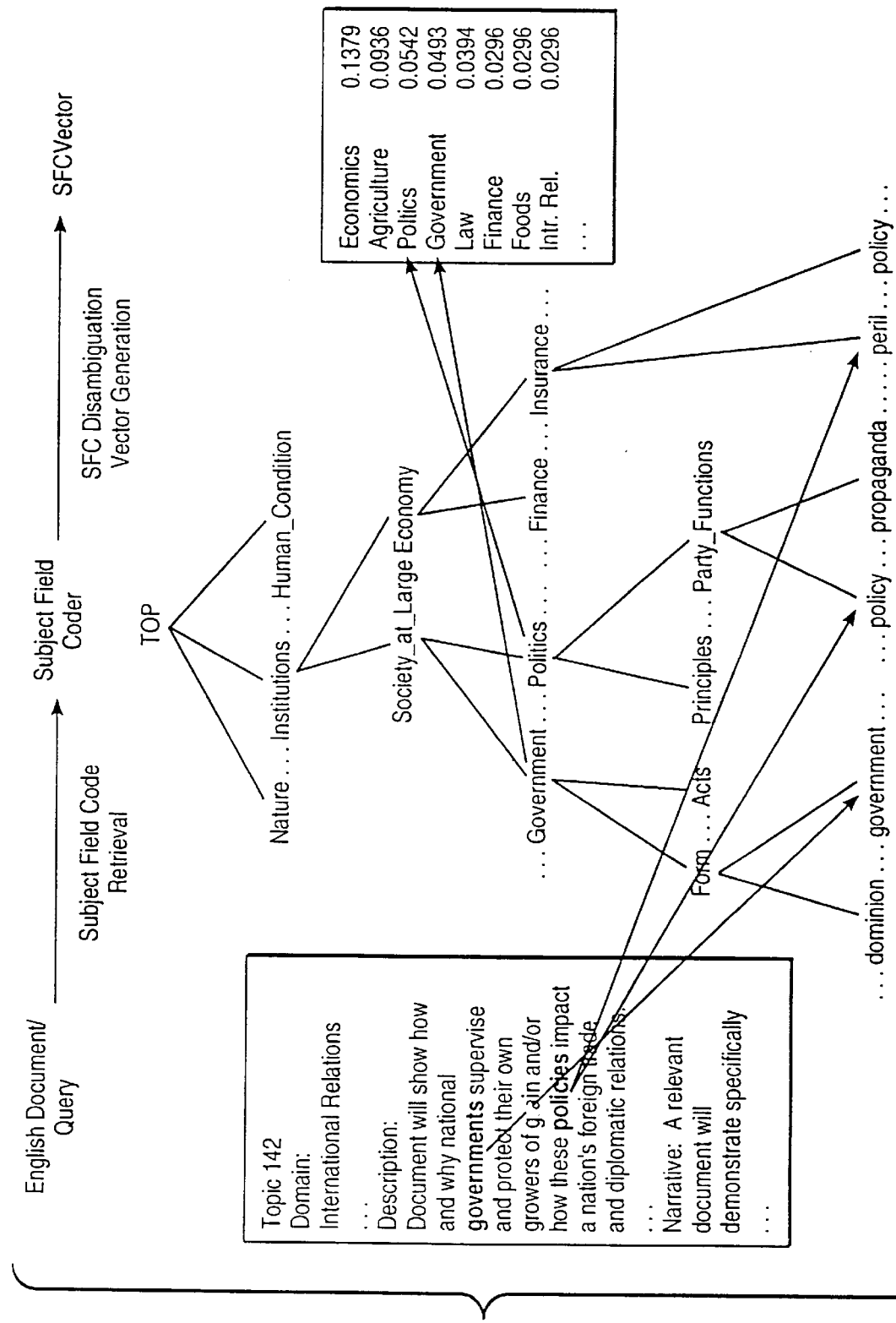
FIG. 6 shows an example of a portion of the processing in a monolingual system.

By way of background, FIG. 6 shows an example of a portion of the processing in a monolingual system such as described in "Natural Language Processing." In particular, FIG. 6 shows the SFC system for monolingual vector representation of the conceptual contents of a document.

6.0 Generation of Term-Based Representations

6.1 Probabilistic Term Indexer (PTI) 210

PTI 210 accepts the output from PNC 140 (documents only) and creates a new appended field in the document index file. The PTI also assigns a weighted, TF.IDF score (the product of Term Frequency and Inverse Document Frequency) for each proper noun. This could be applied to other types of terms. This weighted score is used in QDM and score combiner 230. This index file contains all proper nouns and their associated TF.IDF scores.

PTI 210 assigns TF.IDF scores for each proper noun as follows:

$$TF*IDF = (ln(TF)+1)*ln(N+1/n)$$

where TF is the number of occurrences of a term within a given document, IDF is the inverse of the number of documents in which the term occurs, compared to the whole corpus, N is the total number of documents in the corpus, and n is the number of documents in which the term occurs. The product of TF.IDF provides a quantitative indication of a term's relative uniqueness and importance for matching purposes. TF.IDF scores are calculated for documents and queries. The IDF scores are based upon the frequency of occurrence of terms within a large, representative sample of documents in each supported language.

The output of the PTI is an index of proper nouns and expansions with associated TF.IDF scores.

6.2 Probabilistic Query Processor (PQP) 220

PQP 220 accepts the native-language query with disambiguated concept group assignments for each substantive word in the query from MCGD 160 and performs the following processing:

(a) Negation

It is common for queries to simultaneously express both items of interest and those items that are not of interest. For example, a query might be phrased "I am interested in A and B, but not in C." In this instance, A and B are required (they are in the "positive" portion of the query) and C is negated and not required (it is in the negative portion of the query). Only terms in the positive portion of the query are considered for document matching. The PQP uses the principles of text structure analysis and models of discourse to identify the disjunction between positive and negative portions of a query. The principles employed to identify the positive/negative disjunction are based on the general observation among discourse linguists that writers are influenced by the established schema of the text-type they produce, and not just on the specific content they wish to convey. This established schema can be delineated and used to computationally instantiate discourse-level structures. In the case of the discourse genre of queries written for online retrieval systems, empirical evidence has established several techniques for locating the positive/negative disjunction.

(a1) Lexical Clues

For each supported language there exists a class of frequently used words or phrases that, when connected in a logical sequence, are used to establish the transition from the positive to the negative portion of the query (or the reverse). In English such a sequence might be as simple as "I am interested in" followed by ", but not." Clue words or phrases must have a high frequency of occurrence within the confines of a particular context.

(a2) Component Ordering

Components in a query tend to occur in a certain repetitive sequence, and this sequence can be used as a clue to establish negation.

(a3) Continuation Clues

Especially in relatively long queries a useful clue for negation disjunction detection across sentence boundaries is conjunctive relations which occur near the beginning of a sentence and which have been observed in tests to predictably indicate possible transitions from sentence to sentence.

(b) Construction of Logical Representation of the Query

A tree structure with terms connected by logical operators is constructed using a native-language sublanguage processor.

Figure 7:
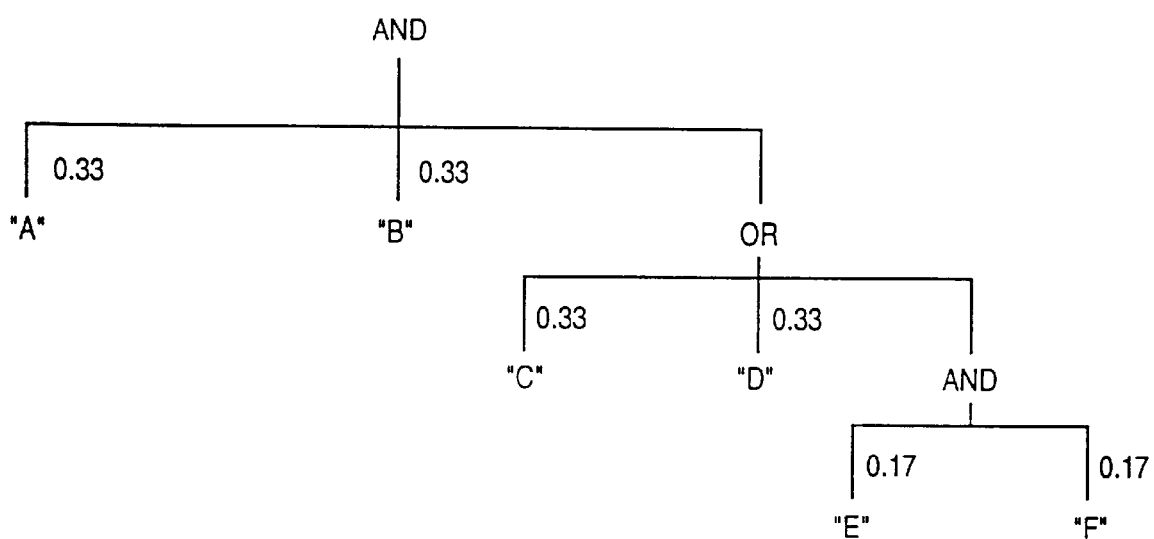
FIG. 7 shows a logical tree representation of an exemplary query.

FIG. 7 shows the tree representation of the following query:

"I am interested in any information about A and B and C, D or E and F."

The latter portion of the query can be represented as:

A and B and (C or D or (E and F)).

The tree structure includes a head term, which can be a Boolean AND or OR operator (AND in this case), which links, possibly through intermediate nodes, to extracted query terms at terminal nodes (A, B, C, D, E, and F). The intermediate nodes are also Boolean AND or OR operators.

Various lexical clues are used to determine the logical form of the query. The basis of this system is a sublanguage grammar which is based on probabilistic generalizations regarding the regularities exhibited in a large corpus of query statements. The sublanguage relies on items such as function words (the placement of articles, auxiliaries and prepositions), meta-text phrases, and punctuation (or the combination of these elements) to recognize and extract the formal logical combination of relevancy requirements from the query. The sublanguage interprets the query into pattern-action rules which reveal the combination of relations that organize a discourse, and which allow the creation from each sentence of a first-order logic assertion, reflecting the Boolean assertions in the text.

Part of this sublanguage is a limited anaphor resolution (that is, the recognition of a grammatical substitute, such as a pronoun or pro-verb, that refers back to a preceding word or group of words). An example of a simple anaphoric reference is shown below:

"I am interested in the stock market performance of IBM. I am also interested in the company's largest foreign shareholders."

In this example, the phrase "the company's" is an anaphoric reference back to "IBM."

A summary of the fuzzy Boolean operators and their function is shown in Table 2, below.

TABLE 2

Logical Operators Used in Sublanguage Processing

| Operator | Operation | Fuzzy weight/Score |
|---|---|---|
| AND | Boolean AND | Addition of scores within AND operator |
| OR | Boolean OR | Maximum score from all ORed terms |
| !NOT | Negation | — |

Each term in the logical representation is assigned a weighted score. Scores are normalized such that the maximum attainable score during matching (if all terms are successfully matched with a document) is 1.0. During matching the fuzzy logical AND operator performs an addition with all matched ANDed term scores. The fuzzy OR operator selects the highest weighted score from among all the matched ORed terms. For example, in the query representation of FIG. 7, if terms A, C and F are matched, then the score assigned the match would be 0.66 (that is, 0.33 from the match with A, and 0.33 from the match with C, which is the higher of the ORed C and F weighted scores).

The negation operator (!NOT) divides the query into two logical portions: the positive portion of the query contains all positive assertions in the query statement; the negative portion of the query contains all the negative assertions in the query. No score is assigned to this operation.

The output of the PQP is a logical representation of the query requirements with fuzzy Boolean weights assigned to all terms.

7.0 Matching Documents with Queries

Documents and queries are processed for matching in their English language form to take advantage of the monolingual processing modules of the DR-LINK information retrieval system [Liddy 94a]; [Liddy 94b]; [Liddy 95].

Documents are arranged in ranked order according to their relative relevance to the substance of a query. The matcher uses a variety of evidence sources to determine the similarity or suitable association between query and documents. Various representations of document and query are used for matching, and each document-query pair is assigned a match score based on (1) the distance between vectors, and (2) the frequency and occurrence of proper nouns.

The fact that the documents are represented in a common, language-independent vector format of weighted slot values, no matter what the language of the individual documents, enables the system to treat all documents similarly. Therefore, it can: (1) cluster documents based on similarity amongst them, and (2) provide a single list of documents ranked by relevancy, with documents of various languages interfiled. Thus the process whereby documents are retrieved and ranked for review by the user is language independent.

7.1 Monolingual Category Vector Matcher (MCVM) 200

MCVM 200 is similar to the Subject Field Code (SFC) matcher described in "Natural Language Processing."

The process of document to query matching using the monolingual category vector is:

(a) Generation of the monolingual category vector for query and document (see earlier discussion and FIGS. 3A and 3B).

(b) Generation of distance/proximity measures. The vector for each text is normalized in order to control for the effect of document length. The vector codes can be considered a special form of controlled vocabulary (all words and terms are reduced to a finite number of vector codes). A similarity measure of the association or correlation of the query and document vectors is assigned by simulating the distance/proximity of the respective vectors in multi-dimensional space using similarity measure algorithms.

7.2 Query to Document Matcher (QDM) and Score Combiner 230

QDM and score combiner 230 accepts three input streams: the TF.IDF scores for documents from the document index created by PTI 210; the logical query representation from PQP 220; and the vector representation of both document and query from the MCVM 200. The output of the QDM and score combiner module is a score representing the match between documents and query.

Using the evidence sources listed above, the matcher determines the similarity or suitable association between the query and the documents. Various representations of document and query are used for matching. Each document-query pair is assigned a series of match scores based on (1) the common occurrence of proper nouns or expansions in the logical query representation, (2) TF.IDF scores, and (3) the distance between vectors.

Documents are assigned scores using the following evidence:

(a) Monolingual Category Vectors. The proximity of the vector for query and document.

(b) Positive TF.IDF (TF.IDF for the positive portion of the query). Matching is based on a natural-log form of the equation TF.IDF, where TF is the number of occurrences of a term within a given document, and IDF is the inverse of the number of documents in which the term occurs, compared to the whole corpus (see description of PTI 210). The scores are normalized to the highest TF.IDF score for all documents.

(c) Query match. The matching of proper nouns (or other terms) and expansions scored from the logical query representation.

7.3 Document Scores

A logistic regression analysis using a Goodness of Fit model is applied to compute a relevance score for each document. Three independent variables, corresponding to the three types of evidence mentioned above, are used.

Regression coefficients for each variable in the regression equation are calculated using an extensive, representative, multilingual test corpus of documents for which relevance assignments to a range of queries have been established by human judges.

The logistic probability (logprob) of a given event is calculated as follows:

$$\text{logprob (event)} = 1/(1+e^{-Z})$$

where Z is the linear combination $$Z = B_o + B_1 B_1 + B_2 X_2 + B_3 X_3$$

and $B_{1-3}$ are the regression coefficients for the independent variables $X_{1-3}$. Documents are ranked by their logistic probability values, and output with their scores.

8.0 Presentation of Results 8.1 Recall Predictor 240

The matching of documents to a query organizes documents by matching scores in a ranked list. The total number of presented documents can be selected by the user or the system can determine a number using the Recall Predictor (RP) function. Note that documents from different sources are interfiled and ranked in a single list.

The RP filtering function is accomplished by means of a multiple regression formula that successfully predicts cut-off criteria for individual queries based on the similarity of documents to queries as indicated by the vector matching (and preferably the proper noun matching) scores. The RP is sensitive to the varied distributions of similarity scores (or match scores) for different queries, and is able to present to the user a certain limited percentage of the upper range of scored documents with a high probability that close to 100% recall will be achieved. The user is asked for the desired level of recall (up to 100%), and a confidence interval on the retrieval. While in some cases a relatively large portion of the retrieved documents would have to be displayed, in most cases for 100% recall with a 95% confidence interval less than 20% of the retrieved document collection need be displayed. In trials of the DR-LINK system (level of recall 100%, confidence level 95%), the system has collected an average of 97% of all documents judged relevant for a given query [Liddy 94b].

8.2 Graphical User Interface (GUI) 250

GUI 250 uses clustering techniques to display conceptually-similar documents. The GUI also allows users to interact with the system by invoking relevance feedback, whereby a selection of documents or a single document can be used as the basis for a reformulated query to find those documents with conceptually similar contents.

The GUI for the CINDOR system is specifically intended to be suitable for users of any nationality, even if their knowledge of foreign languages is sparse. Graphic representations of documents will be used, with textual/descriptive representations kept to a minimum. Research has shown that the factors that influence comprehension of new data are (1) the rate at which information is presented, (2) the complexity of the information, and (3) how meaningful the new information is. Highly meaningful information is accepted with relative ease; less meaningful information, in addition to being less useful, requires greater cognitive effort to comprehend (and usually reject). Coherence of presentation and an association with existing knowledge are both highly correlated with increased meaningfulness. Thus the concept behind the user interface is to present "details on demand," showing only enough information to allow quick apprehension of relevance: more details are immediately available though hypertext links.

8.3 Document Clustering, Browsing and Relevance Feedback

The monolingual category vectors are used as the basis for the clustering and display, and for the implementation of relevance feedback in the system:

8.3.1 Clustering

Documents can be clustered using an agglomerative (hierarchical) algorithm that compares all document vectors and creates clusters of documents with similarly weighted vectors. The nearest neighbor/Ward's approach is used to determine clusters, thus not forcing uniform sized clusters, and allowing new clusters to emerge when documents reflecting new subject areas are added. These agglomerative techniques, or divisive techniques, are appropriate because they do not require the imposition of a fixed number of clusters.

Using the clustering algorithm described above, or other algorithms such as single link or nearest neighbor, CINDOR is capable of mining large data sets and extracting highly relevant documents arranged as conceptually-related clusters in which documents from several languages co-occur.

Headlines from newspaper articles or titles from documents in the cluster are used to form labels for clusters. Headlines or titles are selected from documents that are near the centroid of a particular cluster, and are therefore highly representative of the cluster's document contents. An alternative labeling scheme, selectable by the user, is the use of the labeled subject codes which make up either the centroid document's vector or the cluster vector.

The user is able to browse the documents, freely moving from cluster to cluster with the ability to view the full documents in addition to their summary representation. The user is able to indicate those documents deemed most relevant by highlighting document titles or summaries. If the user so decides, the relevance feedback steps can be implemented and an "informed" query can be produced, as discussed below.

The CINDOR system is thus able to display a series of conceptually-related clusters in response to a browsing query. Each cluster, or a series of clusters, could be used as a point of departure for further browsing. Documents indicative of a cluster's thematic and conceptual content would be used to generate future queries, thereby incorporating relevance feedback into the browsing process. The facility for browsing smaller, semantically similar sub-collections which contain documents of multiple languages aids users in determining which documents they might choose to have translated.

8.3.2 Developing "Informed" Queries for Relevance Feedback

Relevance feedback is accomplished by combining the vectors of user-selected documents or document clusters with the original query vector to produce a new, "informed" query vector. The "informed" query vector will be matched against all document vectors in the corpus or those that have already passed the cut-off filter. Relevant documents will be re-ranked and re-clustered.

1. Combining of Vectors. The vector for the original query and all user-selected documents are weighted and combined to form a new, single vector for re-ranking and re-Clustering.

2. Re-Matching and Ranking of Corpus Documents with New, "Informed" Query Vector. Using the same similarity measures described above for MCVM 200, the "informed" query vector is compared to the set of vectors of all documents above the cut-off criterion produced by the initial query (or for the whole corpus, as desired), then a revised query-to-document concept similarity score is produced for each document. These similarity scores are the system's revised estimation of a document's predicted relevance. The set of documents are thus re-ranked in order of decreasing similarity of each document's revised predicted relevance to the "informed" query on the basis of revised similarity value.

3. Cut-Off and Clustering after Relevance Feedback. Using the same regression formula described above in connection with recall predictor 240, a revised similarity score cut-off criterion is determined by the system on the basis of the "informed" query. The regression criteria are the same as for the original query, except that only the vector similarity score is considered. The agglomerative (hierarchical) clustering algorithm is applied to the vectors of the documents above the revised cut-off criterion and a re-clustering of the documents will be performed. Given the re-application of the cut-off criterion, the number of document vectors being clustered will be reduced, and improved clustering is achieved.

8.4 Application of "Gloss" Transliteration to Highly Relevant Documents

Conceptual-level matching and disambiguation of words ensures that when these words are translated, the correct sense or meaning will be selected. It is therefore possible to offer a surface-level transliteration of highly relevant documents with a very high degree of certainty that the correct translation of words will be performed.

An example of the transliteration system output is shown below:

| | |
|---|---|
| French Original Text: | Les Surplus et les chutes des prix agricole entrainent |
| CINDOR Transliteration: | rise    fall price   agricultural   bring about |
| English Translation: | The rise and fall of agricultural prices drives |
| French Original Text: | des mouvements sur les marches. La faute a qui? . . . |
| CINDOR Transliteration: | movements         markets.   fault   who? . . . |
| English Translation: | movements   in the   markets. Whose fault is it? . . . |

Only some of the words will be mapped into corresponding, disambiguated words or phrases in another language. Much of the text in a document, especially the functional classes of words, will remain un-transliterated. Indeed, one of the strengths of this approach is that the laborious and expensive process of translating a great many foreign documents to ascertain relevance can be avoided. With CINDOR, only those few documents that obtain a high relevance ranking and show promise in their transliterated form become candidates for full translation, if desired. The selection of words could be based on (1) whether they have been indexed in the MCD, (2) their POS-tag assignment, (3) anaphoric disambiguation, and (4) meta-textual and discourse-level considerations, such as whether words and phrases are in the headline of a text.

8.5 Machine Translation of Relevant Documents

Documents or document clusters that, based on their high relevance ranking, the gloss transliteration, or other factors, are deemed to be highly relevant to a query, and are candidates for a machine translation of the original foreign language text. CINDOR thus ensures that only those few documents that are especially pertinent to a query will undergo the full translation process.

CINDOR incorporates a range of computer aided translation modules, each a COTS technology, that translate a given document from one language to another. The selection of the appropriate COTS module is automatic, being based on the language identification assignment for each document provided by LI 120 and on the identified language of the query. For any given query and range of documents it is likely that multiple translation modules will be activated.

Each machine translation COTS module, or MT engine, will process source documents to create a given translation without human intervention or aid. In cases where the document contains arcane or industry-specific terminology, such as with medical or legal documents, multilingual mapping terminology managers with objects stored in a conceptual orientation may also be invoked to aid the translation process.

9.0 References

[Liddy94a] Liddy, E. D. & Myaeng, S. H. (1994). DR-LINK System: Phase I Summary. *Proceedings of the TIPSTER Phase I Final Report*.

[Liddy94b] Liddy, E. D., Paik, W., Yu, E. S. & McKenna, M. (1994). Document retrieval using linguistic knowledge. *Proceedings of RIAO '94 Conference*.

[Liddy95] Liddy, E. D., Paik, W., McKenna, M. & Yu, E. S. (1995). A natural language text retrieval system with relevance feedback. *Proceedings of the 16th National Online Meeting*.

10.0 Conclusion

In conclusion, it can be seen that the present invention provides an elegant and efficient tool for multilingual document retrieval. The system permits even those searchers with limited or no knowledge of foreign languages to gather highly relevant information from international sources. Since the system offers a "gloss" transliteration of target texts, the user is able to ascertain relevance of foreign-language texts so as to be able to make an intelligent decision regarding full translation.

While the above is a complete description of specific embodiments of the invention, various modifications, alternative constructions, and equivalents may be used. For example, while the specific embodiment augments concept level matching through the use of term-based representations and matching, it is possible to implement an embodiment using concept level matching alone. Additionally, evidence combination criteria could be modified for different retrieval criteria. For example, some specific terms or some specific concept categories may be considered mandatory for matching, such that matching would be a two-step process of foldering based on logical requirements, and within folders regression-based matching scores would be used.

Similarly, while the described disambiguation method is the presently preferred method, there are other possibilities, such as statistical or entirely probabilistic techniques. Indeed, disambiguation of concept codes, while preferred, is not essential. Moreover, the concept vector categories, codes, and hierarchy could be modified or expanded, as could the proper noun categories, codes, and hierarchy.

Another language-independent method of representing text is using n-gram coding, wherein a text is decomposed to a sequence of character strings, where each string contains n adjacent characters from the text. This can be done by moving an n-character window n characters at a time, or by moving the n-character window one character at a time. In an n-gram representation, no attempt is made to understand, interpret or otherwise catalog the meaning of the text, or the words that make up the text. A tri-gram representation is the special case where n=3. Representation and matching are based on the co-occurrence of n-grams or a sequence of character strings, or on the co-occurrence and relative prevalence of such n-grams, or on other, similar schemes. Such analysis is an alternative representational scheme for CINDOR.

In this alternative embodiment, an n-gram query processor (NQP) module replaces probabilistic query processor (PQP) 220, an n-gram document processor replaces probabilistic term Indexer (PTI) 210, and an n-gram query to document matcher replaces query to document matcher (QDM 230). The NQP accepts the native-language input and performs the following processing: a) decomposes each term in the queries into n-adjacent-character strings; and b) lists each unique n-adjacent-character string with the number of occurrences as the document representation. The NDP accepts the output from PNC 140 and performs the following processing: a) decomposes each term in the document into n-adjacent-character strings; and b) lists each unique n-adjacent-character string with the number of occurrences as the query representation. The NQDM accepts two input streams, namely the outputs from the NQP and NDP, and provides a score representing the match between the documents and query. This output is an input to the score combiner. Documents are assigned scores by measuring the degrees of overlap between the n-gram decomposed terms from documents and queries. The larger the overlap, the higher the degree of relevance.

Therefore, the above description should not be taken as limiting the scope of the invention as defined by the claims.

What is claimed is:

1. A method of representing documents in a database that includes documents in a plurality of languages, the method carried out for each document, comprising:

determining a set of potential conceptual-level meanings of at least some words in the document from a language-independent multilingual concept database that reflects the plurality of languages and comprises a collection of concept groups;

mapping the sets of potential conceptual-level meanings, so determined, to respective single language-independent conceptual-level meanings; and generating a language-independent conceptual representation of the subject content of the document based on the language-independent conceptual-level meanings determined in said mapping step.

2. The method of claim 1, and further comprising, determining the language of the document for at least some documents.

3. The method of claim 1, and further comprising
generating a term-based representation of the document for at least some documents.

4. The method of claim 3 wherein the term-based representation of the document is a representation of a set of proper nouns found in the document.

5. The method of claim 4 wherein the set of proper nouns found in the document are represented as categories from a hierarchical classification scheme.

6. The method of claim 3 wherein the term-based representation of the document is a representation of a set of noun phrases found in the document.

7. The method of claim 1 wherein a given one of said words is polysemous, giving rise to multiple conceptual-level meanings from the multilingual concept database, and said mapping, for the given word, comprises:

disambiguating among the multiple conceptual-level meanings from the multilingual concept database to provide a single multilingual conceptual-level meaning;

mapping the single multilingual conceptual-level meaning to a set of monolingual concept categories in a monolingual concept dictionary; and if the set of monolingual concept categories from the monolingual concept dictionary contains multiple monolingual concept categories, disambiguating among the multiple monolingual concept categories to provide the single language-independent conceptual-level meaning.

8. The method of claim 7 wherein disambiguating includes:

analyzing local context information to attempt to determine a single meaning;

if a single meaning is not determined from analyzing local context information, analyzing domain knowledge to attempt to determine a single meaning; and if a single meaning is not determined from analyzing domain knowledge, analyzing global information to attempt to determine a single meaning.

9. The method of claim 7, and further comprising
providing a gloss transliteration using the single multilingual conceptual-level meaning derived from disambiguating among the multiple conceptual-level meanings.

10. The method of claim 1 wherein the collection of concept groups includes words or phrases, from the plurality of languages, that are conceptually synonymous.

11. The method of claim 1, and further comprising:

determining a measure of proximity of the language-independent conceptual representation of each document to the language-independent conceptual representation of the other documents in the plurality; and clustering the documents in the plurality according to the documents' respective measures of proximity to each other.

12. A method of retrieving documents in response to a query, the query being in a user-selected language of a plurality of languages, the method comprising:

providing a corpus of documents, each in a language of said plurality of languages, at least one of the documents being in a language other than the user-selected language;

for each document;

determining a set of multilingual concepts of at least some words in the document using a language-independent multilingual concept database that reflects the plurality of languages and comprises a collection of concept groups;

mapping the sets of multilingual concepts, so determined, to respective single language-independent conceptual-level meanings; and generating a language-independent conceptual representation of the subject content of the document based on the language-independent conceptual-level meanings determined in said mapping;

generating a language-independent conceptual representation of the subject content of the query; and for each document, generating a measure of relevance of the document to the query using the conceptual representation of the subject content of the document and the conceptual representation of the subject content of the query.

13. The method of claim 12 wherein the query is a natural language query.

14. The method of claim 12 wherein generating a language-independent conceptual representation of the subject content of the document comprises:

generating a conceptual-level vector representing the subject content of the document.

15. The method of claim 12 wherein;

the concept groups include a collection of synonyms and near-synonyms of a given word or phrase in said plurality of languages;

a given word in the document is polysemous, giving rise to multiple conceptual-level meanings from the multilingual concept database; and for the given word, mapping the sets of multilingual concepts to respective single language-independent conceptual-level meanings comprises:

disambiguating the multiple conceptual-level meanings.

16. The method of claim 15 wherein disambiguating the multiple conceptual-level meanings comprises:

disambiguating among the multiple conceptual-level meanings from the multilingual concept database to provide a single multilingual conceptual-level meaning;

mapping the single multilingual conceptual-level meaning to a set of monolingual concept categories in a monolingual concept dictionary; and if the set of monolingual concept categories from the monolingual concept dictionary contains multiple monolingual concept categories, disambiguating among the multiple monolingual concept categories to provide the single language-independent conceptual-level meaning.

17. The method of claim 16 wherein disambiguating includes:

analyzing local context information to attempt to determine a single meaning;

if a single meaning is not determined from analyzing local context information, analyzing domain knowledge to attempt to determine a single meaning; and if a single meaning is not determined from analyzing domain knowledge, analyzing global information to attempt to determine a single meaning.

18. The method of claim 16, and further comprising providing a gloss transliteration using the single multilingual conceptual-level meaning derived in disambiguating among the multiple conceptual-level meanings.

19. The method of claim 12, and further comprising providing a gloss transliteration of at least some of the words in at least one of the documents.

20. The method of claim 12 wherein said language-independent conceptual representation of the subject content of the document is augmented by a language-dependent statistical index using words in the document's language as indexing units.

21. The method of claim 12 wherein said language-independent conceptual representation of the subject content of the document includes a statistical index using N-gram style decomposed words as indexing units.

22. The method of claim 12 wherein generating a language-independent conceptual representation of the subject content of the query comprises:

mapping words or phrases in the query into language-independent concepts; and generating a conceptual-level vector representing the subject content of the query.

23. The method of claim 12 wherein said language-independent conceptual representation of the subject content of the query includes N-gram style decomposed terms as language-independent query requirements.

24. The method of claim 12 wherein said language-independent conceptual representation of the subject content of the query is augmented using a language-dependent logic requirement, the logic requirement including terms and logical connectives where the terms include the query term and its synonymous terms in the multilingual concept database.

25. The method of claim 12, and further comprising:

providing a list of at least some of the documents;

receiving user input specifying at least one document, or a part thereof, on the list; and generating a revised query representation based on the original query plus a representation of the specified document or documents, or parts thereof.

26. The method of claim 12, and further providing a relevance-ranked list of at least some of the documents.

27. The method of claim 26, wherein the number of documents in the relevance-ranked list of documents is calculated based on a user-specified level of recall.

28. The method of claim 26, wherein the number of documents in the relevance-ranked list of documents is calculated based on a user-specified level of recall and a user-specified level of confidence in that level of recall.

29. The method of claim 26, wherein retrieved documents in the relevance-ranked list of documents are ranked without regard to the language they are written in.

30. The method of claim 12, and further determining the language of the document before generating a language-independent representation of the document.

31. The method of claim 12 wherein generating a measure of relevance for a given document comprises:

generating conceptual-level vectors for the given document and for the query; and determining a distance between the vectors, the distance representing the measure of relevance, with a smaller distance representing a higher degree of relevance.

32. The method of claim 12 wherein generating a measure of relevance for a given document comprises:

generating an N-gram decomposed term representation for the given document and for the query; and determining a degree of overlap between the N-gram decomposed terms, the overlap representing the measure of relevance, with a larger overlap representing a higher degree of relevance.

33. The method of claim 12 wherein generating a measure of relevance for a given document comprises:

generating word representations for the given document and for the query;

organizing words in the query as logical requirements; and determining a coverage of terms in the documents against the logical requirement of a query, the coverage representing the measure of relevance, with a larger coverage representing a higher degree of relevance.

34. A method of retrieving documents in response to a query in a user-selected language of a plurality of languages, the method comprising:

(a) providing a corpus of documents, each in a language of said plurality of languages, at least some of the documents being in a language other than the user-selected language;

(b) processing each document by determining the language of the document, determining conceptual-level meaning of at least some words in the document from a language-independent multilingual concept database comprising a collection of concept groups, mapping the conceptual-level meanings into language-independent concepts, and generating a conceptual-level vector representing the subject content of the document;

(c) processing the query by mapping words or phrases in the query into language-independent concepts, and generating a conceptual-level vector representing the subject content of the query; and (d) for each document, determining a measure of relevance to the query.

35. The method of claim 34 wherein mapping the conceptual-level meanings into language-independent concepts comprises disambiguating multiple senses of polysemous words and phrases to generate the language-independent concepts.

* * * * *